United States Patent

[11] 3,584,901

| [72] | Inventor | Allan H. Willinger<br>New Rochelle, N.Y. |
|---|---|---|
| [21] | Appl. No. | 20,486 |
| [22] | Filed | Mar. 26, 1970 |
| [45] | Patented | June 15, 1971 |
| [73] | Assignee | Mattel-Aquarium, Inc.<br>Hawthorne, Calif.<br>Continuation of application Ser. No.<br>676,163, Oct. 18, 1967, now abandoned. |

[54] PLASTIC TUBING COMBINATION
5 Claims, 4 Drawing Figs.

[52] U.S. Cl. .................................................. 285/177
[51] Int. Cl. ..................................................... F16l 25/00

[50] Field of Search............................................ 285/177, 8, 238, 239

[56]         References Cited
         UNITED STATES PATENTS
2,688,499   9/1954   Hanson ....................... 285/8
         FOREIGN PATENTS
151,146   7/1952   Australia....................... 285/177

*Primary Examiner*—David J. Williamowsky
*Assistant Examiner*—Wayne L. Shedd
*Attorney*—Friedman & Goodman ABSTRACT: The invention is directed to a novel plastic tubing combination comprising a length of plastic tubing having a reduced inside and outside diameter, which tubing is adapted by novel connecting means to be joined with larger diameter members.

PATENTED JUN15 1971 3,584,901
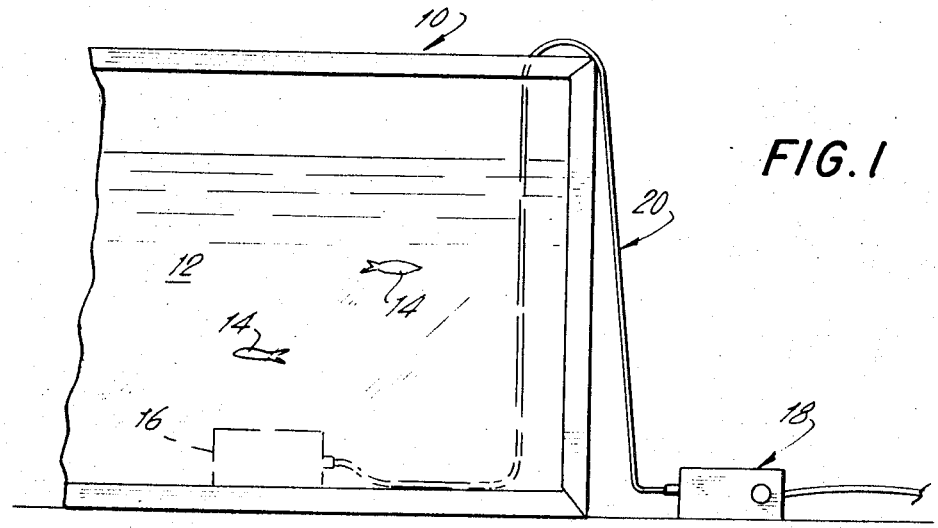
FIG.1
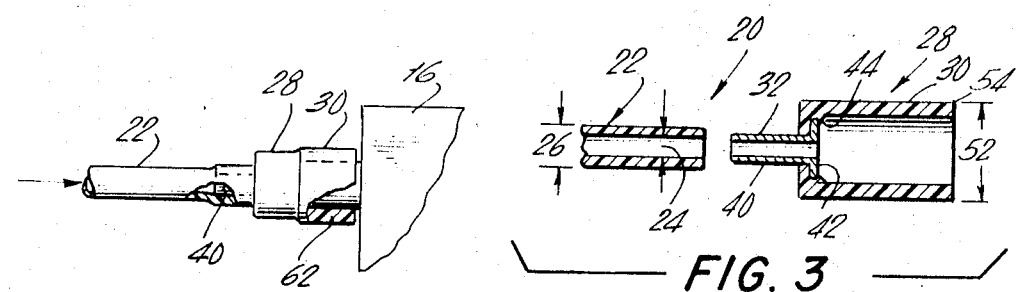
FIG. 2
FIG. 3
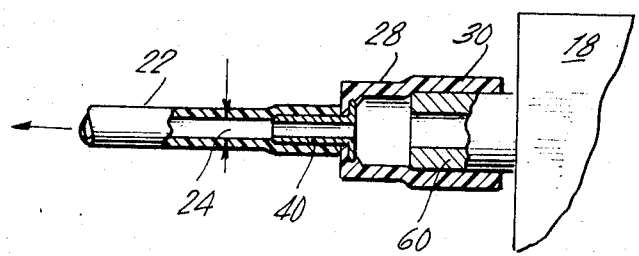
FIG. 4
INVENTOR.
ALLAN H. WILLINGER
BY
Friedman & Goodman
ATTORNEYS

PLASTIC TUBING COMBINATION

This application is a continuation of application Ser. No. 676,163, filed Oct. 18, 1967, and now abandoned.

BACKGROUND OF THE INVENTION

In the aquarium art, it is of course well known to employ filters to purify the water contained in aquariums. It is also well known to employ aerators, e.g., air stones, to circulate the aquarium water so that fresh oxygen is distributed throughout. Conventionally, small electric pumps provide the force which motivates the filters and aerators, aforementioned, i.e., the pump forces air through plastic tubing connected to a filter or an aerator at the bottom of the aquarium. This prior art tubing, e.g., polyvinyl chloride (PVC), or the like, is of a relatively large size having generally an inside diameter of three-sixteenths inch and an outside diameter of one-fourth inch. As a result of these large dimensions when air is pumped through the tubing an air pocket is formed which continually tends to force the plastic tubing to the surface of the water. In order to counter this buoyant force weights must be provided to keep the tubing from rising to the surface, or it must be wrapped around some object in the tank. However, because of the large size of the tubing it is relatively stiff and, therefore, difficult to manipulate in the desired position. It would therefore be of tremendous advantage if a relatively thin diameter tubing could be provided which would not tend to rise to the tank surface and, moreover, would be because of its thin dimension, relatively easy to manipulate in any desired shape.

SUMMARY OF THE INVENTION

It is therefore among one of the principal objectives to provide a tubing of relatively thin diameter which is nevertheless adaptable to be employed with existing equipment.

In accordance with the present invention there is now provided a thin plastic tubing, suitable for use in the aquarium art, having a substantially reduced inside and outside diameter, in combination with connecting means which render said tubing adaptable to existing equipment formerly serviced by the prior art large diameter tubing. The connecting means further comprise a coupling device which is adapted at its one end to be inserted into said thin plastic tubing and at its other end to receive the larger diameter air-receiving or air-delivering member.

BRIEF DESCRIPTION OF THE DRAWING

The invention will be hereinafter more fully described with reference to the accompanying drawing, in which:

FIG. 1 is a fragmentary front view showing the invention tubing combination as employed with a filter and a pump for an aquarium;

FIG. 2 is a view partially in cross section and fragmented showing the tubing coupled to the air-receiving member of the filter;

FIG. 3 is a fragmentary view in cross section showing the tubing and connecting means therefor in detached relationship, and FIG. 4 is a fragmentary view, partially in cross section showing the tubing coupled to the air-delivering member of the pump.

DESCRIPTION OF THE PREFERRED EMBODIMENTS

Referring now to the FIGS. of the drawing, for purposes of illustration FIG. 1 depicts an aquarium 10 with water 12 and fish 14 contained therein. Also shown therein is a water filter 16; it could also be an aerator, or the like. A conventional electric pump 18 for delivering air to said filter 16 is also provided. The air is delivered to the filter by means of the invention tubing combination 20 which is shown connected at its ends to the pump and filter.

The tubing combination 20, FIG. 3, comprises a length of tubing 22 of thin configuration, by virtue of its small inside and outside diameter 24 and 26, respectively, and a coupling device 28 which acts as a connecting means to air-delivering or air-receiving members as will be subsequently described hereinbelow. Coupling device 28 further comprises a molded tubular plastic body member 30 having a metal member 32 partially molded into one end 34 thereof, said metal member 32 being adapted to be inserted into thin plastic tubing 22 and act as air conveying means therefor. Metal member 32 has a tubular shaped body 40 which extends outwardly from end 34 of body member 30 in horizontal fashion, said tubular shaped body 40 terminating integrally with a flange collar 42, which flange collar 42 is molded inside end 34 of plastic body member 30. Flange collar 42 is securely held inside end 34 by an overlap 44 of plastic deposited thereon during the molding process. Metal member 32 may be any suitable metal such as copper; however, it is a critical feature of the invention that the metal be reduced to an extremely narrow thickness so that a flow of air therethrough will not be impeded by relatively thick walls. If the coupling device 28 is to be employed in aquariums, then metal member 32 should be nickel plated to prevent poisoning of the fish.

Tubular plastic body member 30 has an inside and outside diameter 50 and 52, respectively, which is substantially the same as conventional plastic tubing, aforementioned. Thus, the end 54 opposite metal air-conveying member 32 is resultingly adapted to receive air-delivering member 60 (FIG. 4) of pump 18, or air-receiving member 62 (FIG. 2) of filter 16, which respective air-delivering and receiving members have much larger outside diameters than the inside diameter 24 of tubing 22. As shown, in FIGS. 2 and 4, thin tubing 22, having joined at either end a coupling device 28 by means of tubular shaped body 40 of metal air-conveying member 32 inserted into inside diameter 24 of said tubing 22, is connected to air-receiving member 62 of filter 16 and air-delivering member 60 of pump 18 by slidingly engaging plastic body member 30 over said members 62 and 60. The pump is then activated and air is forced through coupling device 28 into tubing 22 and thence finally into filter 16, in the direction of the arrows. By virtue of the fact that the metal of member 32 is made extremely thin the flow of air is not impeded through tubular body 40. If it were otherwise made relatively thick then the flow of air would necessarily be impeded.

A tubing combination made according to the invention is described hereinbelow and serves as an example of the invention, but it is to be understood that the example is merely illustrative in nature and it is not intended to limit the invention thereto.

EXAMPLE

Polyvinyl Chloride (PVC) Tubing:
Inside diameter—3/64 inch
Outside diameter—3/32 inch
Metal Air Conveying Member:
Nickel-plated copper—0.008 inch thick
Outside diameter (body)—0.062 inch
Length of tubular body—0.200 inch
Flange collar diameter—0.160—0.175 inch
Plastic Body Member:
Inside diameter—3/16 inch
Outside diameter—1/4 inch While polyvinyl chloride (PVC) is the preferred plastic, it is to be understood that any other like plastic may be used for the tubing and the coupling plastic.

Thus, it can be seen that the invention has provided a novel tubing combination which because of the small diameter of the thin tubing tends to prevent the tubing from rising to the surface of the aquarium water (i.e., small air pocket), and which thin tubing is easily manipulated around ornaments and objects in the aquarium. Moreover, the tubing being so thin it is almost invisible to the eye thereby not detracting from the aesthetic features of the aquarium.

By the device of the invention there is no need to change existing dimensions of conventional equipment, since the tubing is easily coupled to the same.

Having thus described the invention as applied to a specific embodiment, it is to be understood that various changes may be made in the form of the device illustrated without departing from the spirit and scope thereof.

What I claim is:

1. In combination, a coupling device comprising a molded substantially tubular shaped plastic body and a thin plastic tubing having a substantially smaller inside and outside diameter than said tubular shaped plastic body, one end of said tubular shaped plastic body being secured to an air-delivering member and having an internal diameter smaller than the external diameter of said air-delivering member when in its unstressed condition, said one end of said tubular shaped body being deformed by said air-delivering member when secured thereto to provide the sole means of securement between said air-delivering member and said tubular shaped body, a metal air-conveying member having a flanged collar at one end thereof, said flanged collar being disposed within said tubular shaped body and positionally secured therewithin at the other end thereof, the other end of said metal air-conveying member being disposed outwardly of said tubular shaped body, the inside diameter of said tubing being smaller than the outside diameter of said metal air-conveying member when in its unstressed condition, one end of said tubing being deformed by the other end of said metal air-conveying member when secured thereto to provide the sole means of securement between said respective ends, the other end of said tubing being slidably engageable to a member to which said tubing is to be coupled, and wherein the ratio of the internal diameter of said tubular shaped body to the inside diameter of said plastic tubing is greater than 3 to 1.

2. The combination according to claim 1, wherein said flanged collar at one end of said metal air-conveying member is at least partially molded inside said other end of said tubular shaped plastic body by means of an overlap deposited upon said flanged collar.

3. The combination according to claim 2, wherein the thickness of the walls of said plastic tubing is substantially one thirty-second of an inch.

4. The combination according to claim 1, wherein said other end of said plastic tubing is slidably engageable to an air-receiving member, said other end of said plastic tubing having an inside diameter which is smaller than the outside diameter of said air-receiving member when in its unstressed condition, and said other end of said tubing being deformed by said air-receiving member when secured thereto to provide the sole means of securement between said air-receiving member and said other end of said tubing.

5. The combination according to claim 3, wherein the walls of said metal air-conveying member have a thickness of about 0.008 of an inch.